US010611274B2

(12) United States Patent
Kakishima et al.

(10) Patent No.: US 10,611,274 B2
(45) Date of Patent: Apr. 7, 2020

(54) INTEGRATED CHILD BOOSTER SEAT

(71) Applicant: TACHI-S ENGINEERING U.S.A., INCORPORATED, Farmington Hills, MI (US)

(72) Inventors: Yasuo Kakishima, Farmington Hills, MI (US); Pankaj Kulkarni, Farmington Hills, MI (US)

(73) Assignee: TACHI-S ENGINEERING U.S.A., INCORPORATED, Farmington Hills, MI (US)

( * ) Notice: Subject to any disclaimer, the term of this patent is extended or adjusted under 35 U.S.C. 154(b) by 83 days.

(21) Appl. No.: 16/027,964

(22) Filed: Jul. 5, 2018

(65) Prior Publication Data

US 2020/0009998 A1    Jan. 9, 2020

(51) Int. Cl.
*B60N 2/32*    (2006.01)
*B60N 2/26*    (2006.01)
*B60N 2/90*    (2018.01)

(52) U.S. Cl.
CPC ............ *B60N 2/32* (2013.01); *B60N 2/26* (2013.01); *B60N 2/995* (2018.02)

(58) Field of Classification Search
None
See application file for complete search history.

(56) References Cited

U.S. PATENT DOCUMENTS

| 179,991 A * | 7/1876 | Bennett | B64D 11/06 297/62 |
| 5,409,293 A | 4/1995 | Nagasaka | |
| 9,586,507 B2 * | 3/2017 | Correia | B60N 2/919 |
| 9,676,301 B2 * | 6/2017 | Sam | B60N 2/30 |
| 9,718,380 B2 * | 8/2017 | Abro | B60N 2/32 |

FOREIGN PATENT DOCUMENTS

| DE | 19845014 A1 | 4/2000 |
| GB | 2439521 A | 1/2008 |
| JP | 09-86247 A | 3/1997 |
| JP | 2005-225304 A | 8/2005 |

OTHER PUBLICATIONS

International Search Report dated Jul. 25, 2019, in connection with International Application No. PCT/US2019/029126.
Written Opinion of the International Searching Authority dated Jul. 25, 2019, in connection with International Application No. PCT/US2019/029126.
Notification of Transmittal of the International Search Report and the Written Opinion of the International Searching Authority dated Jul. 25, 2019, in connection with International Application No. PCT/US2019/029126.

* cited by examiner

*Primary Examiner* — David E Allred
(74) *Attorney, Agent, or Firm* — Fitch, Even, Tabin & Flannery, L.L.P.

(57) ABSTRACT

An integrated child booster seat, to allow more securely switching of a usual seat and a child seat with a relatively simple configuration, in which a seat cushion is configured by a cushion part in which a seat for a general passenger is formed on one side and a child seat is formed on the reverse side, a coupling pipe which coaxially supports the front and the back of the cushion part and which is swingably held with outside of lateral sides of the cushion part in the center of turning, supporting parts that bind and support the cushion part, and binding release parts that release binding by the supporting parts of the cushion part.

10 Claims, 9 Drawing Sheets

INTEGRATED CHILD BOOSTER SEAT

BACKGROUND

The present invention relates to an integrated child booster seat acquired by applying a child seat facility to a seat cushion of the vehicle seat.

For an integrated seat acquired by applying a child seat facility to a seat cushion of a vehicle seat, in Japanese Patent Application Laid-Open No. 9-86247, a configuration that a child seat part is separable and a child seat forming part is not left on the floor side when a seat cushion is pulled up and is pushed down forward is described.

In addition, in Japanese Patent Application Laid-Open No. 2005-225304, a seat equipped with seating structure for a child provided with a footrest on which child's feet can be put in a natural condition according to child's conformation is described.

SUMMARY

In the configuration disclosed in Japanese Patent Application Laid-Open No. 9-86247, a seat cushion body is configured by coupling a divided seat being a part on the front side and a seat cushion part being a part on the rear side and a child seat is formed by releasing coupling and piling the divided seat on the seat cushion part. However, in such a configuration, a coupling member for coupling the divided seat and the seat cushion part again in a state in which the divided seat is piled on the seat cushion part is required. When the child seat is unused, the coupling member is required to be held without being lost and it is inconvenient. In addition, as the coupling member is attached on the side of a seat back, workability is unsatisfactory and it may take much time to attach the coupling member.

In the meantime, the seat equipped with seating structure for a child disclosed in Japanese Patent Application Laid-Open No. 2005-225304 has a configuration that when a child uses it, a second cushion member connected to a cushion member of a seat cushion by a hinge and covering the center on the front side is piled on the cushion member by turning the second cushion member with the hinge in the center. However, as the cushion member and the second cushion member are connected by the hinge, the hinge hits a passenger's leg when the seat is used as a usual seat cushion and the passenger may feel a sense of discomfort.

The present invention presents an integrated child booster seat which settles the problems of the abovementioned related art and which enables more securely switching a usual seat and a child seat with a relative simple configuration.

To settle the abovementioned problems, the present invention is based upon an integrated vehicle seat equipped with a child seat facility which is provided with a seat cushion, a seat back, a headrest and a mechanism arranged under the seat cushion, wherein the seat cushion includes a cushion part in which a seat cushion for a general passenger is formed on the side of one face and a child seat is formed on the side of a face on the reverse side to the one face, a coupling pipe which coaxially supports one location on the front side and one location on the back side of the cushion part and swingably held with the outside of lateral sides of the cushion part in the center of turning, supporting parts that bind the cushion part coaxially supported by the coupling pipe and supports the cushion part and a binding release part that releases the binding of the cushion part by the supporting part. In addition, a top face of the cushion part is switched from the face on which the seat cushion for a general passenger is formed to the face on which the child seat is formed or is switched to the contrary by releasing the binding by the supporting parts of the cushion part by the binding release parts, swinging the coupling pipe and turning the cushion part with the one location on the front side and the one location on the back side respectively coaxially supported by the coupling pipe in the center in a state in which the cushion part is lifted.

Moreover, to settle the abovementioned problems, the present invention is based upon an integrated vehicle seat equipped with a child seat facility which includes a seat cushion, a seat back, a headrest and a mechanism arranged under the seat cushion, wherein a cushion part in which a seat cushion for a general passenger is formed on the side of one face, a child seat is formed on the side of a face on the reverse side to the one face, and two front and rear pairs of pins are provided in opposite positions on both lateral sides, a coupling pipe which coaxially supports one location on the front side and one location on the back side of the cushion part and swingably held with the outside of lateral sides of the cushion part in the center of turning, a pair of binding/supporting parts that bind one pair of pins out of the two front and rear pairs of pins of the cushion part and support the cushion supported by the coupling pipe, binding release parts that respectively release binding of the one pair of pins by the pair of binding/supporting parts, and a pair of supporting parts that support the other pair of pins out of the two front and rear pairs of pins of the cushion part. In addition, a top face of the cushion part is switched from the face on which the seat cushion for a general passenger is formed to the face on which the child seat is formed or is switched to the contrary by releasing the binding by the pair of binding/supporting parts of the one pair of pins by the binding release parts, swinging the coupling pipe, and coaxially half-turning the cushion part coaxially supported by the coupling pipe in a state that the cushion is lifted.

According to the present invention, in the integrated child booster seat, securer switching of the usual seat and the child seat is enabled with the relatively simple configurations.

These features and advantages of the invention will be apparent from the following more particular description of preferred embodiments of the invention, as illustrated in the accompanying drawings.

DESCRIPTION OF THE PREFERRED EMBODIMENTS

The present invention is based upon an integrated vehicle seat equipped with a child seat facility, and has a characteristic that so as to enable more securely switching a usual seat and a child seat with a relatively simple configuration, a seat cushion is configured by a cushion part in which the seat cushion for a general passenger is formed on one side and the child seat is formed on the reverse side, a coupling pipe coaxially supporting the front and the back of the cushion part and swingably held with the outside of a side of the cushion part in the center of turning, a supporting part that binds and supports the cushion part and a binding release part that releases binding by the supporting part of the cushion part. In addition, the present invention has another characteristic that a top face of the cushion part is switched from a face on which the seat cushion for a general passenger is formed to a face on which the child seat is formed or is switched to the contrary by releasing the binding of the cushion part by the binding release part and turning the cushion part coaxially supported by the coupling pipe in a state in which the coupling pipe is swung.

Hereby, according to the present invention, in the integrated child booster seat, readily switching the vehicle seat for a general adult (passenger) and the child seat according to an application is enabled.

An embodiment of the present invention will be described using the drawings below.

Embodiment

Figure 1:
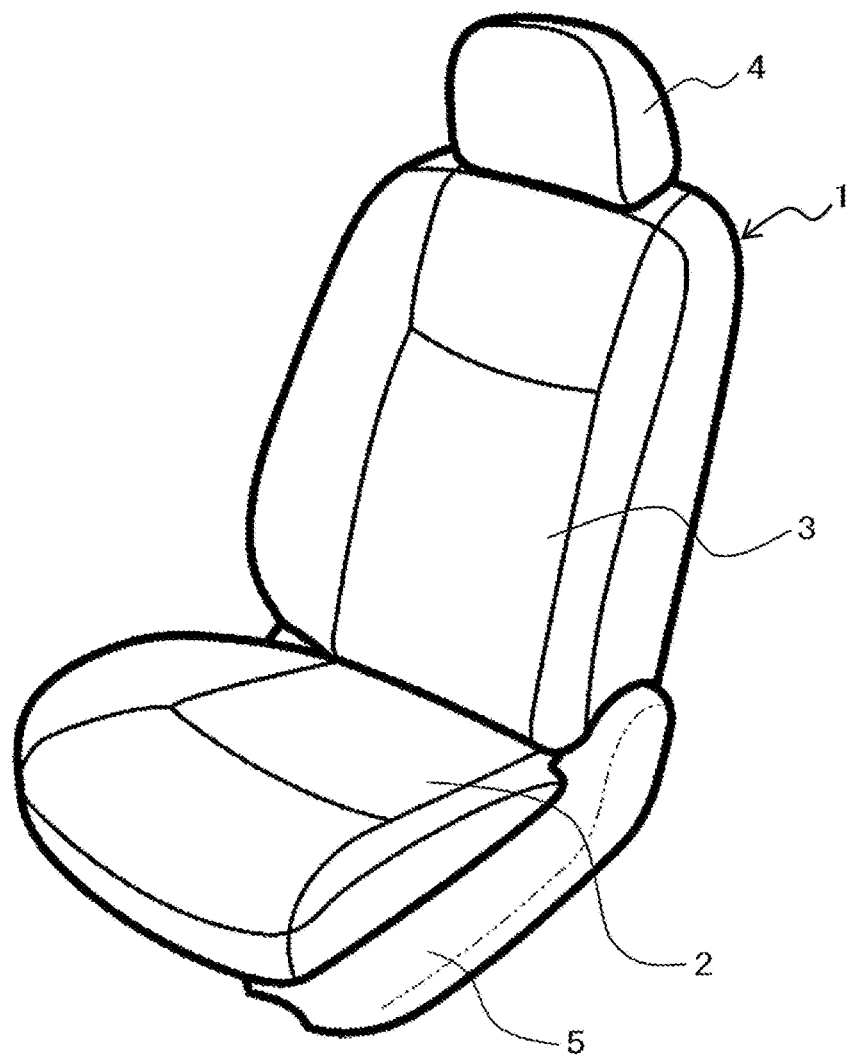
FIG. 1 is a perspective view showing the whole configuration of a vehicle seat equivalent to an embodiment of the present invention.

FIG. 1 is a perspective view showing the whole configuration of a vehicle seat 1 equivalent to this embodiment. The vehicle seat 1 equivalent to this embodiment is provided with a seat cushion 2 for a passenger to be seated, a seat back 3 for the passenger to lean on, a headrest 4 for protecting a passenger's head and a mechanism 5 having a sliding mechanism and others.

Figure 2:
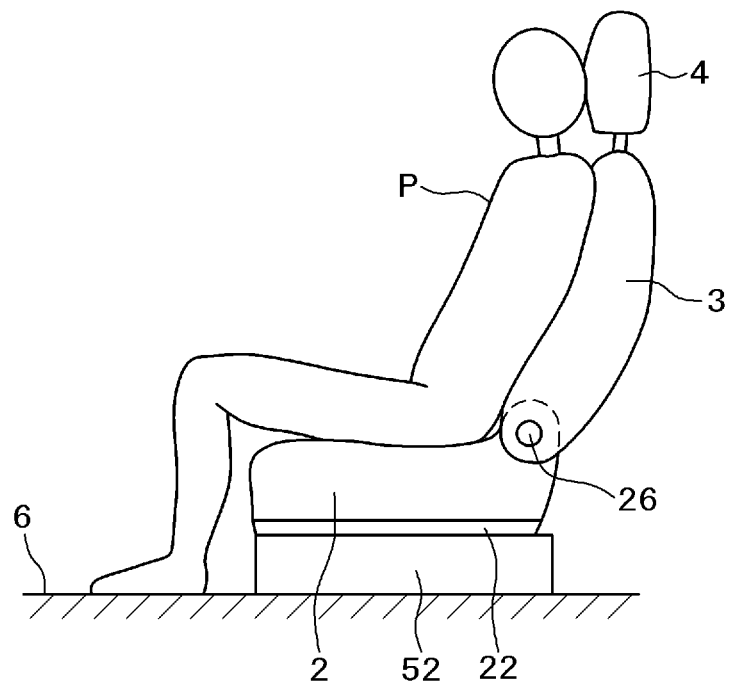
FIG. 2 is a side view showing a state that a passenger is seated on the vehicle seat equivalent to the embodiment of the present invention.

FIG. 2 shows a state that the passenger P (a general adult) is seated on the vehicle seat 1. The passenger P is seated on a top face of the seat cushion 2 with passenger's both feet put on a floor 6.

Figure 3:
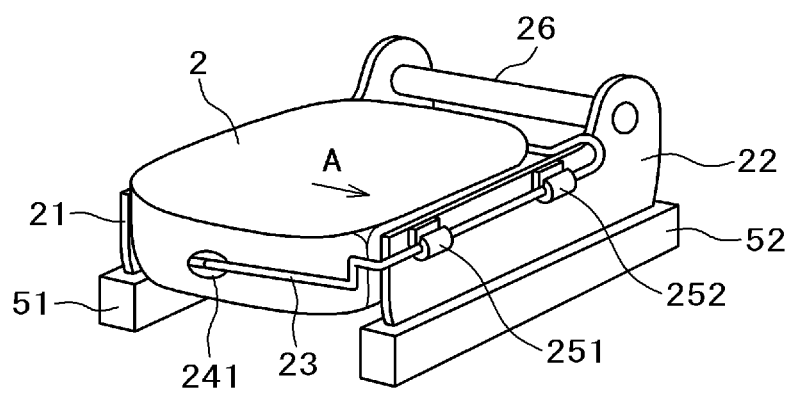
FIG. 3 is a perspective view showing a seat cushion viewed from the diagonal upside in a state in which a cover of a mechanism of the vehicle seat equivalent to the embodiment of the present invention is removed.

FIG. 3 is a perspective view showing the seat cushion 2 obliquely viewed from the upside in a state that a cover of the mechanism 5 is removed. The seat cushion 2 is supported by a pair of right and left seat risers 21, 22. The pair of right and left seat risers 21, 22 is installed on the sliding mechanisms 51, 52 respectively movable longitudinally of the mechanism 5. In addition, the pair of right and left seat risers 21, 22 is coupled by a coupling rod 26.

A reference numeral 23 denotes a coupling pipe. The coupling pipe 23 is supported turnably around each central axis of a pair of brackets 251, 252 by the pair of brackets 251, 252 respectively fixed to an upper part of the seat riser 22. Ends on both sides of the coupling pipe 23 are set on detents 241, 242 coaxially provided to the front side and the back side of the seat cushion 2 and coaxially support the seat cushion 2 in a longitudinal direction.

Figure 4:
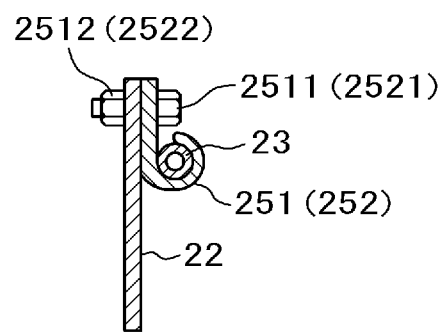
FIG. 4 is a sectional view showing a state that a coupling pipe is turnably supported around an axis of a bracket of the vehicle seat equivalent to the embodiment of the present invention.

FIG. 4 shows a state that the coupling pipe 23 is supported turnably around each axis by the bracket 251 (252). The bracket 251 (252) is fixed to the upper part of the seat riser 22 using a bolt 2511 (2521) and a nut 2512 (2522).

Figure 5:
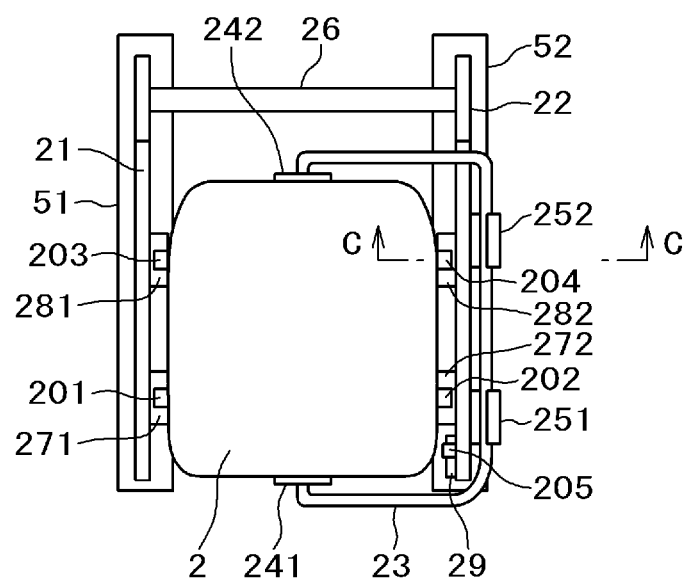
FIG. 5 is a plan view showing the seat cushion of the vehicle seat equivalent to the embodiment of the present invention.
Figure 6:
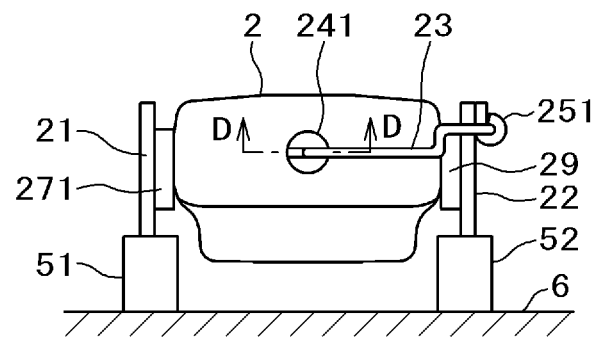
FIG. 6 is a front view showing the seat cushion of the vehicle seat equivalent to the embodiment of the present invention.

FIG. 5 is a plan view showing the seat cushion 2 and FIG. 6 is a front view showing the seat cushion. Pins 201, 202 and pins 203, 204 are laterally protruded from the seat cushion 2. Out of the pins, the pins 201, 202 are held by latch-and-strikers 271, 272. In the meantime, the pins 203, 204 are set on bumper rubbers 281, 282 that can absorb impact force. Weight of the passenger seated on the seat cushion 2 is supported by these four pins 201, 202, 203, 204.

In addition, the detent 241 is provided to the front side of the seat cushion 2 and the detent 242 is provided to the back side, and the ends of the coupling pipe 23 are inserted into the respective detents. The coupling pipe 23 is held by the brackets 251, 252 fixed to the seat riser 22.

A reference numeral 29 denotes a lever and the lever is provided to open/close the latch-and-strikers 271, 272.

Figure 7:
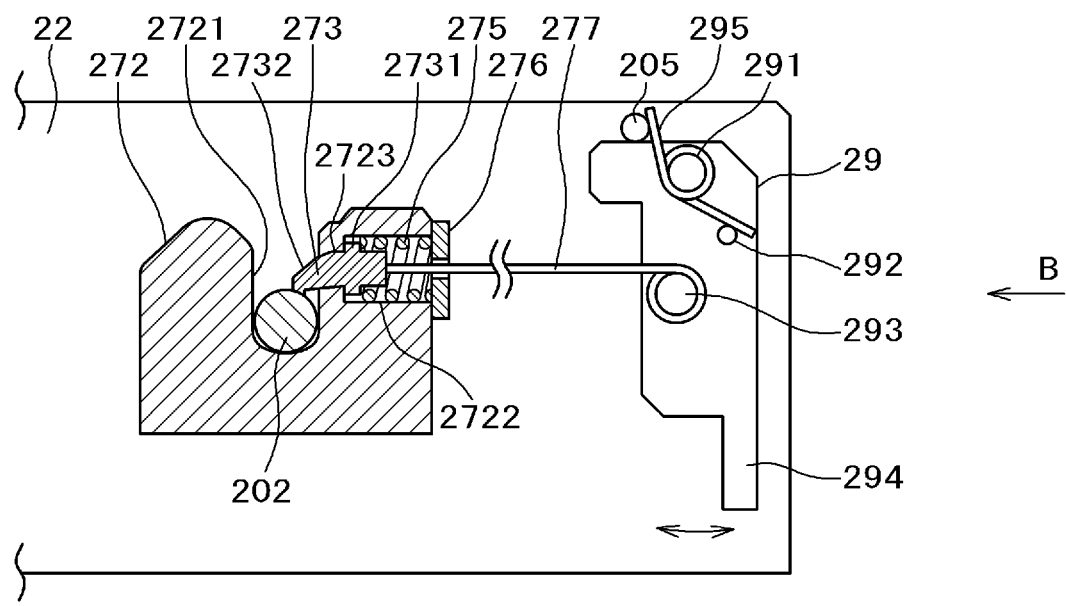
FIG. 7 is a front view showing a seat riser viewed from a direction shown by an arrow A in FIG. 3 in the vehicle seat equivalent to the embodiment of the present invention.

FIG. 7 is a view showing the seat riser 22 viewed from a direction shown by an arrow A in FIG. 3 and shows a state that the latch-and-striker 272 and the lever 29 are attached to the seat riser 22. The latch-and-striker 272 is fixed to the seat riser 22 by welding or using a bolt. In the meantime, the lever 29 is supported by the seat riser 22 turnably around a pin 291 fixed to the seat riser 22.

The pin 202 protruded from the seat cushion 2 is housed at the bottom of a groove 2721 formed in the latch-and-striker 272. In this state, the pin 202 is turned in a state that its upside is held down by a stopper pin 273 and the pin cannot easily get out of the groove 2721.

The stopper pin 273 is housed in a hole 2722 formed in the latch-and-striker 272. A flange 2731 is formed on the stopper pin 273, is extruded by a compression spring 275, and the flange 2731 is stopped in a state that the flange 2731 is hit on a boundary wall of a small-diameter hole 2723 formed at an end of the hole 2722. In this state, an end of the stopper pin 273 is protruded into the groove 2721 of the latch-and-striker 272. A right end of the hole 2722 is closed by a plate 276 having a hole in the center so as to prevent the compression spring 275 from being extruded from the hole 2722.

To extract the pin 202 protruded from the seat cushion 2 and housed at the bottom of the groove 2721 of the latch-and-striker 272 from the groove 2721, operation for pulling an end 294 of the lever 29 rightward in FIG. 7 (counterclockwise with the pin 291 in the center, forward opposite to the seat cushion 2) is required to be performed and as a result, a wire 277 attached to a rear end of the stopper pin 273 is pulled rightward in FIG. 7. A pin 293 is fixed to the lever 29 and the wire 277 attached to the rear end of the stopper pin 273 is held by the pin 293.

In addition, a pin 292 is fixed to the lever 29 and a torsion spring 295 is fitted between the pin 292 and a stopper 205 fixed to the seat riser 22. Force in a direction in which the torsion spring 295 is pressed on the stopper 205, that is, clockwise force with the pin 291 in the center acts on the lever 29 by action of the torsion spring 295. Hereby, when the lever 29 is not operated, the lever 29 is pressed on the stopper 205 and the wire 277 is pushed leftward in FIG. 7. As a result, the end of the stopper pin 273 pressed by the compression spring 275 is protruded on the side of the groove 2721 through the small-diameter hole 2723 of the latch-and-striker 272.

In the meantime, when the end 294 of the lever 29 is pulled counterclockwise, the wire 277 fixed to the pin 293 is pulled and the end of the stopper pin 273 protruded into the groove 2721 of the latch-and-striker 272 is pulled back inside the small-diameter hole 2723. Hereby, the pin 202 housed at the bottom of the groove 2721 can be extracted from the groove 2721 of the latch-and-striker 272.

Conversely, to house the pin 202 at the bottom of the groove 2721 of the latch-and-striker 272, the pin 202 has only to be pressed on the end 2732 of the stopper pin 273 protruded into the groove 2721 of the latch-and-striker 272 from the upside. A top face of the end 2732 of the stopper pin 273 has a tapered cross section and the stopper pin 273 is moved back on the side of the small-diameter hole 2723 by pressing the pin 202 from the upside. Hereby, the pin 202 can be housed at the bottom of the groove 2721 of the latch-and-striker 272.

As relation between the pin 201 and the latch-and-striker 271 shown in FIG. 5 is the same as the abovementioned relation between the pin 202 and the latch-and-striker 272, description is omitted. However, no configuration equivalent to the lever 29 is provided on the side of the latch-and-striker 271, the wire 277 connected to the lever 29 on the side of the latch-and-striker 272 is branched by means not shown, and a stopper pin equivalent to the stopper pin 273 on the side of the latch-and-striker 272 has only to be operated similarly at the same time as the stopper pin 273.

Movement in a vertical direction and in the longitudinal direction of the seat cushion 2 is regulated by a configuration that the pins 201, 202 are held by the latch-and-strikers 271, 272, and a position of the seat cushion 2 can be stabilized in a state in which the passenger is seated.

Figure 8:
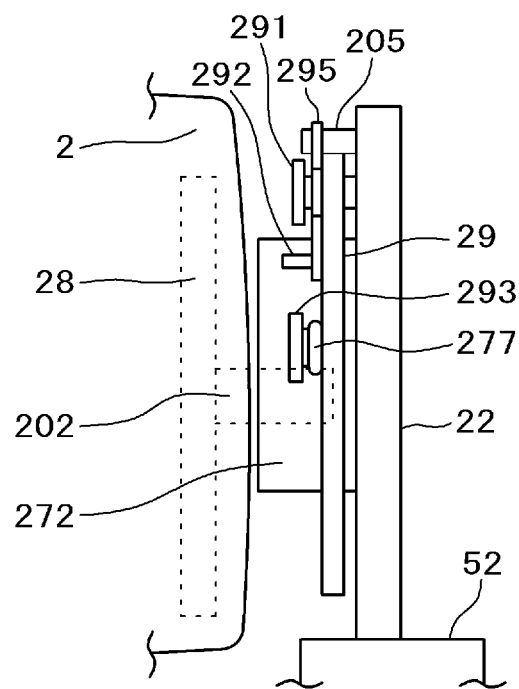
FIG. 8 is a front view showing the configuration shown in FIG. 7 viewed from a direction shown by an arrow B in the vehicle seat equivalent to the embodiment of the present invention.

FIG. 8 is a view showing the configuration shown in FIG. 7 viewed from a direction shown by an arrow B. The lever 29 is fixed to the seat riser 22 by the pin 291 and the latch-and-striker 272 is also fixed to the seat riser 22. In the meantime, the pin 202 is fixed to a seat frame 28 configuring a frame of the seat cushion 2. Though it is not shown, the pin 201 is similarly fixed to the seat frame 28.

In FIG. 8, to simplify illustration, an illustration of the bracket 252 and the coupling pipe 23 respectively attached on the reverse side to the side on which the lever 29 and latch-and-striker 272 are attached of the seat riser 22 is omitted.

Figure 9:
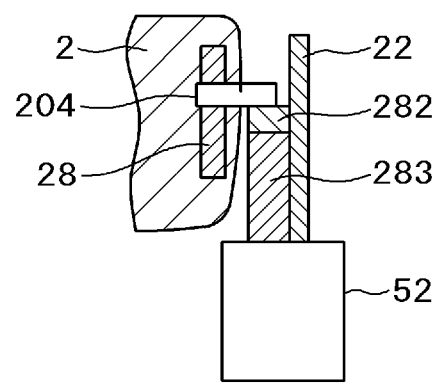
FIG. 9 is a sectional view showing the vehicle seat equivalent to the embodiment of the present invention and viewed along a line C-C in FIG. 5.

FIG. 9 is a sectional view viewed along a line C-C in FIG. 5. The reference numeral 204 denotes the pin attached to the seat frame 28 of the seat cushion 2 and the pin 204 is set on the elastic bumper rubber 282. The bumper rubber 282 is fixed on a pedestal 283 attached to the sliding mechanism 52.

The pin 203 shown in FIG. 5 is also attached to the seat frame 28 of the seat cushion 2 like a configuration of the pin 204 shown in FIG. 9 and is set on the elastic bumper rubber 281 fixed on a pedestal.

Figure 10:
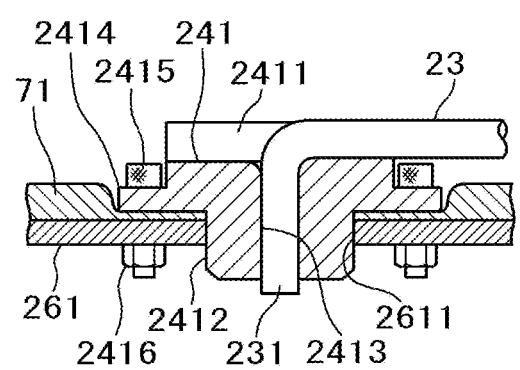
FIG. 10 is a sectional view showing a detent shown in FIG. 6 and viewed along a line D-D in the vehicle seat equivalent to the embodiment of the present invention.

FIG. 10 is a sectional view showing the detent 241 viewed along a line D-D in FIG. 6. The detent 241 has a shape of a flange formed by resin. An end 2412 on the reverse side to a flange-shaped part 2414 of the detent 241 is inserted into a hole 2611 formed through a frame 261. In this state, the flange-shaped part 2414 is fixed by fastening it to the frame 261 of the seat cushion 2 using a bolt 2415 and a nut 2416 from the upside of a facing 71 of the seat cushion 2. As the detent 242 also has the similar configuration to the configuration described in relation to FIG. 10, its description is omitted.

A hole 2413 having a little larger diameter than an outside diameter of an end 231 of the coupling pipe 23 is formed in the center of the flange-shaped detent 241 and the end 231 of the coupling pipe 23 is inserted into the hole 2413.

In addition, a groove 2411 is formed on the upside of the flange-shaped part 2414 of the detent 241. The coupling pipe 23 the end 231 of which is inserted into the hole 2413 is buried in this groove 2411.

Figure 11:
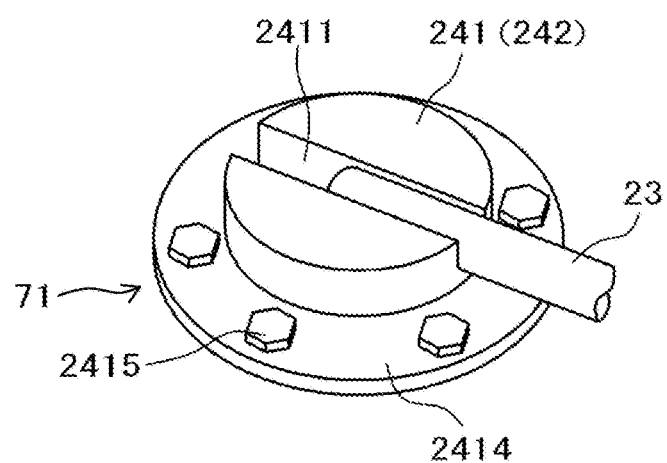
FIG. 11 is a perspective view showing the detent and a coupling pipe in a state that the coupling pipe, an end of which is inserted into a hole of the detent, is buried in a groove of the detent in the vehicle seat equivalent to the embodiment of the present invention.

FIG. 11 is a perspective view showing a state that the coupling pipe 23 the end 231 of which is inserted into the hole 2413 is buried in the groove 2411. A position of the coupling pipe 23 in a rotational direction having the hole 2413 of the seat cushion 2 in the center is regulated by burying the coupling pipe 23 in the groove 2411. Though it is not shown, relation between the detent 242 and the coupling pipe 23 is also similar to the relation shown in FIGS. 10, 11.

Next, a procedure for inverting the seat cushion 2 from a state that the usually used face of the seat cushion 2 is set on the upside and setting the side of a child seat 200 on the upside will be described referring to FIGS. 12 to 15 below. This is performed in a state in which the seat back 3 is pushed back using a reclining mechanism not shown.

First, when the seat cushion 2 is viewed from the front in usual usage, it is in a state shown in FIG. 6. In this state, the stopper pin 273 is backed in the latch-and-striker 272 by pulling the end 294 of the lever 29 shown in FIG. 7 rightward (counterclockwise with the pin 291 in the center, forward for the cushion seat 2), and the stopper pin is pulled back inside the small-diameter hole 2723. Hereby, binding of the pin 202 in the groove 2721 is released.

Figure 12:
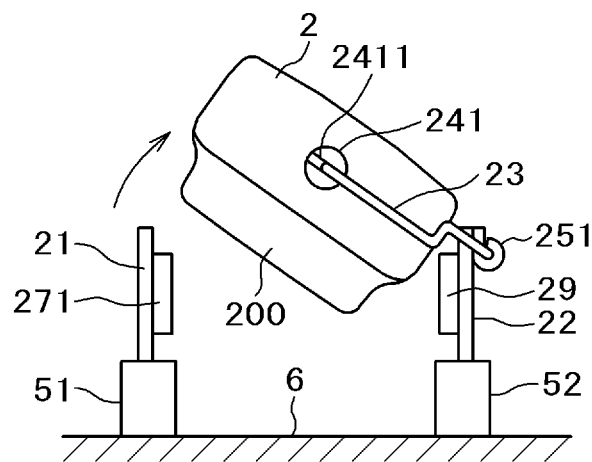
FIG. 12 is a front view showing the seat cushion in a state that the left side of the seat cushion supported by the coupling pipe is lifted in the vehicle seat equivalent to the embodiment of the present invention.

In this state, as shown in FIG. 12, the left side (the side of the seat riser 21) of the seat cushion 2 supported in the longitudinal direction by the coupling pipe 23 is lifted. As the coupling pipe 23 is fitted into the groove 2411 of the detent 241 attached to the front of the seat cushion 2 and into the groove of the detent 242 attached to the back of the seat cushion 2, the coupling pipe 23 is turned (swung) clockwise together with the seat cushion 2 with the axes of the pair of brackets 251, 252 fixed to the upper part of the seat riser 22 in the center.

Next, in a state in which the coupling pipe 23 is swung so as to lift the seat cushion 2 and is turned (swung) by a predetermined angle, the coupling pipe 23 turned by the predetermined angle is held by the stopper not shown. In this state, the ends 231 on both sides of the coupling pipe 23 are lifted from the holes 2413 of the detents 241, 242 and the coupling pipe 23 is taken out of the grooves 2411 formed in the detents 241, 242. Hereby, the seat cushion 2 is turned freely turnable with the holes 2413 in the center for the coupling pipe 23.

Figure 13:
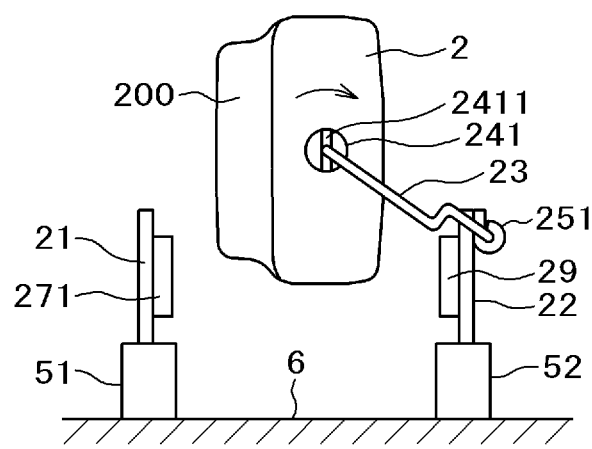
FIG. 13 is a front view showing the seat cushion in a state that the left side of the seat cushion supported by the coupling pipe is lifted and the seat cushion is turned around a hole into which the coupling pipe is inserted of the detent in the vehicle seat equivalent to the embodiment of the present invention.
Figure 14:
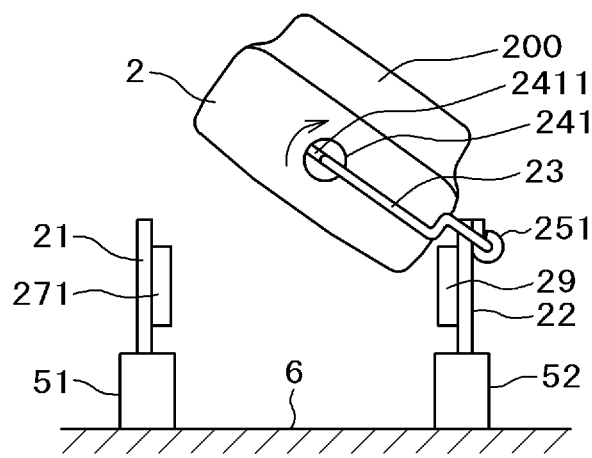
FIG. 14 is a front view showing the seat cushion in a state that the left side of the seat cushion supported by the coupling pipe is lifted, the seat cushion is inverted around the hole into which the coupling pipe is inserted of the detent and the side of a child seat is turned upside in the vehicle seat equivalent to the embodiment of the present invention.

In this state, as shown FIG. 13, the seat cushion 2 is turned around the end parts of the coupling pipe 23 which are inserted in the holes 2413. Further, as shown in FIG. 14, the side of the child seat 200 is directed upward and the coupling pipe 23 is fitted into the grooves 2411 formed in the detents 241, 242. Hereby, a position in a rotational direction of the child seat 200 against the coupling pipe 23 centering the holes 2413 is determined.

Figure 15:
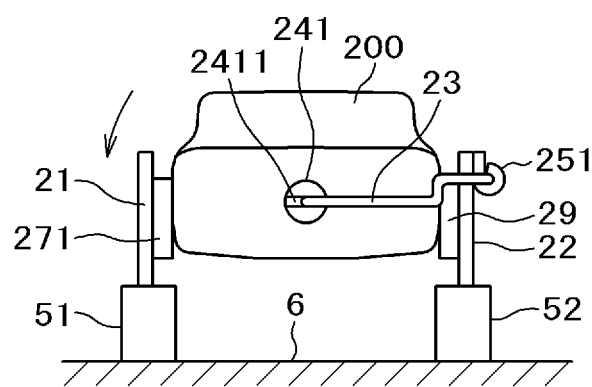
FIG. 15 is a front view showing the seat cushion in a state that the left side of the seat cushion supported by the coupling pipe is restored with the side of the child seat turned upside in the vehicle seat equivalent to the embodiment of the present invention.

Next, in a state in which holding of the coupling pipe 23 by the stopper not shown is released, the seat cushion 2 is pushed down as shown in FIG. 15 and as a result, the coupling pipe 23 is turned (swung) counterclockwise around the part which is bound by the pair of brackets 251, 252 fixed to the upper part of the seat riser 22.

Hereby, the pin 202 attached to the seat frame 28 on the side of the seat cushion 2 is inserted into the groove 2721 of the latch-and-striker 272, is pressed by the stopper pin 273, and is bound at the bottom of the groove 2721. The pin 201 is also similarly bound in the groove (not shown) formed in the latch-and-striker 271.

In the meantime, the pins 203, 204 attached to the seat frame 28 on the side of the seat cushion 2 are set on the bumper rubbers 281, 282.

By the abovementioned series of operation, the seat cushion 2 in a usual specified state shown in FIG. 6 is inverted as shown in FIG. 15 and can be used in a state in which the side of the child seat 200 is set as a top face.

Figure 16:
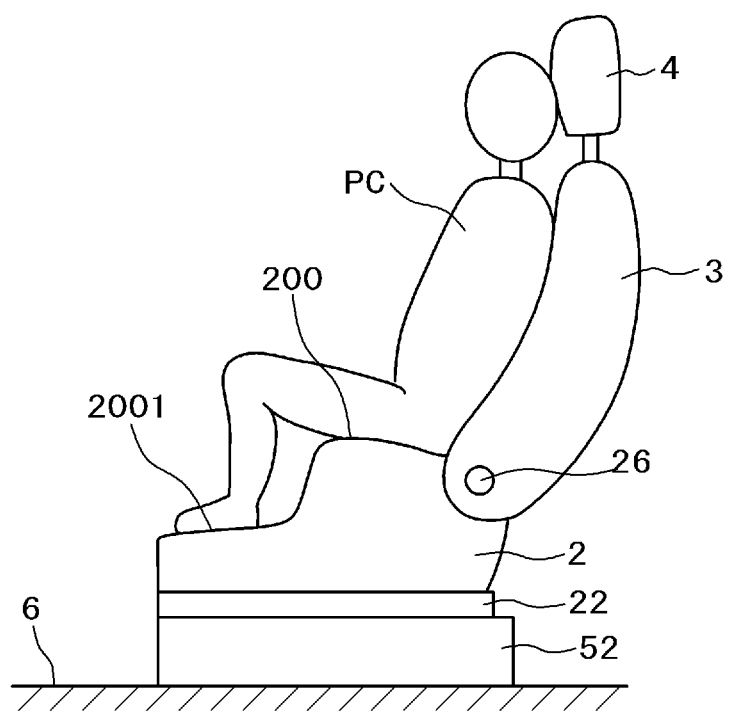
FIG. 16 is a side view showing the vehicle seat equivalent to the embodiment of the present invention in a state that a passenger (a child) is seated with the side of the child seat turned upside.

FIG. 16 is a side view showing a state that a child PC as a passenger is seated in a state that the child seat 200 side is on the top face. The passenger PC is seated on the top face of the child seat 200 side and can put both feet on a footrest 2001.

In the abovementioned embodiment, the configuration that the pins 201, 202 are bound by the latch-and-strikers 271, 272 and the pins 203, 204 are supported on the bumper rubbers 281, 282 is described, however, to the contrary, a configuration that pins 203, 204 are bound by latch-and-strikers 271, 272 and pins 201, 202 are supported on bumper rubbers 281, 282 may be also selected.

According to this embodiment, replacement of the usual seat with the child seat can be relatively simply and securely performed by inverting the seat cushion 2 using the relatively simple mechanism.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

The invention claimed is:

1. An integrated child booster seat, comprising:
a seat cushion;
a seat back;
a headrest; and
a mechanism arranged under the seat cushion,
wherein the seat cushion includes:
a cushion part of the seat cushion, the cushion part comprising one face for a general passenger and a child seat formed on another face on a reverse side relative to the one face;
a coupling pipe coaxially supporting one location on the front side and one location on the back side of the cushion part and swingably supporting the cushion part in a turning center such that outsides of lateral sides of the cushion part are capable of swinging;
supporting parts that bind the cushion part coaxially supported by the coupling pipe and support the cushion part; and
binding release parts that release binding of the cushion part by the supporting parts,
wherein a top face of the cushion part is switched from the one face on which the seat cushion functions for a general passenger to the other face for which the seat cushion functions as the child seat by releasing the binding by the supporting parts of the cushion part by the binding release parts, swinging the coupling pipe and turning the cushion part with the one location on the front side and the one location on the back side respectively coaxially supported by the coupling pipe in the center in a state in which the cushion part is lifted.

2. The integrated child booster seat according to claim 1, wherein the child seat is formed at two stages in height; whereby a passenger is seated on a higher stage; and feet of the passenger are put on a lower stage.

3. The integrated child booster seat according to claim 1, wherein the one location on the front side and the one location on the back side respectively supported coaxially by the coupling pipe of the cushion part are formed by resin; and
in each resin-formed location, a hole for inserting an end of the coupling pipe and a groove connecting with the hole for burying the coupling pipe are formed.

4. The integrated child booster seat according to claim 1, wherein the mechanism is provided with a sliding mechanism configured to support the cushion part for longitudinal fore and aft movement; and
the coupling pipe is turnably held by brackets attached to a plate supported by the sliding mechanism.

5. The integrated child booster seat according to claim 1, wherein the cushion part is provided with front and rear pairs of pins extended outside the cushion part in positions in which the pins of one of the pairs are opposite each other on right and left sides;
the pins of the one pair are bound and supported by the supporting parts; and
the pins of the other pair extend outside the cushion part and are held by members that can absorb impact.

6. An integrated child booster seat, comprising:
a seat cushion;
a seat back;
a headrest; and
a mechanism arranged under the seat cushion,
wherein the seat cushion includes:
a cushion part of the seat cushion, the cushion part comprising one face for a general passenger, a child seat formed on another face on a reverse side relative to the one face, and front and rear pairs of pins that are provided in opposite positions on both lateral sides of the cushion part;

a coupling pipe coaxially supporting one location on the front side and one location on the back side of the cushion part and swingably supporting the cushion part in a turning center such that outsides of lateral sides of the cushion part are capable of swinging;

a pair of binding and supporting parts that bind one of the pairs of pins out of front and rear pairs of pins of the cushion part and support the cushion part supported by the coupling pipe;

binding release parts that release binding by the pair of binding and supporting parts of the one pair of pins; and a pair of supporting parts that support the other pair of pins out of the front and rear pairs of pins of the cushion part;

wherein a top face of the cushion part is switched from the one face on which the seat cushion functions for a general passenger to the other face for which the seat cushion functions as the child seat by releasing the binding by the pair of binding and supporting parts of the one pair of pins by the binding release parts, swinging the coupling pipe, and coaxially half-turning the cushion part while the cushion part is coaxially supported by the coupling pipe in a state that the cushion part is lifted.

7. The integrated child booster seat according to claim 6, wherein the child seat is formed at two stages in height; whereby a passenger is seated on a higher stage; and feet of the passenger are put on a lower stage.

8. The integrated child booster seat according to claim 6, wherein the one location on the front side and the one location on the back side respectively of the cushion part coaxially supported by the coupling pipe of the cushion part are formed by resin; and in each resin-formed location, a hole for inserting an end of the coupling pipe and a groove connecting with the hole for burying the coupling pipe are formed.

9. The integrated child booster seat according to claim 6, wherein the mechanism is provided with a sliding mechanism configured to support the cushion part for longitudinal fore and aft movement; and the coupling pipe is turnably held by brackets attached to a plate supported by the sliding mechanism.

10. The integrated child booster seat according to claim 6, wherein the pair of the supporting parts that support the other pair of pins is formed by a member that can absorb impact.

* * * * *